(12) United States Patent
Ota et al.

(10) Patent No.: US 7,571,660 B2
(45) Date of Patent: Aug. 11, 2009

(54) GEARED MOTOR

(75) Inventors: Akira Ota, Kosai (JP); Hirokazu Tsuda, Toyohashi (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 512 days.

(21) Appl. No.: 11/431,571

(22) Filed: May 11, 2006

(65) Prior Publication Data
US 2006/0254376 A1 Nov. 16, 2006

(30) Foreign Application Priority Data
May 13, 2005 (JP) ............... 2005-141732

(51) Int. Cl.
F16H 1/16 (2006.01)
(52) U.S. Cl. ...................................... 74/425
(58) Field of Classification Search ................ 74/89.14, 74/411, 425, 467, 468; 184/6, 6.12
See application file for complete search history.

(56) References Cited

U.S. PATENT DOCUMENTS

| | | | |
|---|---|---|---|
| 3,365,913 A * | 1/1968 | Shields | 464/16 |
| 3,822,607 A * | 7/1974 | Tharaldsen | 74/468 |
| 4,389,160 A * | 6/1983 | Onal | 416/186 R |
| 4,615,231 A * | 10/1986 | Takahashi | 74/467 |
| 4,748,865 A * | 6/1988 | Umezawa et al. | 74/411 |
| 4,771,864 A * | 9/1988 | Lorimor et al. | 184/6 |
| 4,793,200 A * | 12/1988 | McDonald | 74/331 |
| 4,899,608 A * | 2/1990 | Knappe et al. | 74/411 |
| 4,961,669 A * | 10/1990 | Itoh et al. | 403/359.6 |
| 5,053,661 A * | 10/1991 | Kitamura et al. | 310/83 |
| 5,178,026 A * | 1/1993 | Matsumoto | 74/411 |
| 5,687,612 A * | 11/1997 | Imamura | 74/421 A |
| 6,059,292 A * | 5/2000 | Firestone | 277/301 |
| 6,481,306 B2 | 11/2002 | Adachi et al. | |
| 6,591,707 B2 * | 7/2003 | Torii et al. | 74/425 |
| 6,700,245 B2 * | 3/2004 | Yamamura et al. | 310/75 R |
| 6,782,770 B2 * | 8/2004 | Saito et al. | 74/7 E |
| 2005/0097699 A1 * | 5/2005 | Yagi et al. | 15/250.3 |
| 2006/0207370 A1 * | 9/2006 | Hedman | 74/468 |

FOREIGN PATENT DOCUMENTS

| | | | |
|---|---|---|---|
| DE | 4336489 A1 * | 4/1995 | |
| JP | 62147170 A * | 7/1987 | |
| JP | 2002021990 A * | 1/2002 | |

* cited by examiner

*Primary Examiner*—William C Joyce
*Assistant Examiner*—Matthew A Johnson
(74) *Attorney, Agent, or Firm*—Posz Law Group, PLC

(57) ABSTRACT

In a geared motor, a worm wheel, an O-ring, a transmission plate and an output gear are installed to a support shaft. The O-ring is placed in an inner space of a receiving through hole of the transmission plate, through which the support shaft is received. Grease is applied to an outer peripheral surface of the support shaft. A grease relief passage, which relieves the grease, extends between the output gear and the transmission plate.

16 Claims, 5 Drawing Sheets

GEARED MOTOR

CROSS REFERENCE TO RELATED APPLICATION

This application is based on and incorporates herein by reference Japanese Patent Application No. 2005-141732 filed on May 13, 2005.

BACKGROUND OF THE INVENTION

1. Field of the Invention

The present invention relates to a geared motor that has a motor arrangement and a speed reducing arrangement.

2. Description of Related Art

A geared motor, such as one recited in Japanese Unexamined Patent Publication No. 2002-106649 (corresponding to U.S. Pat. No. 6,481,306 B2), is used as a drive power source of, for example, a power window system. In the above geared motor, a rotational speed of a rotatable shaft of a motor arrangement is reduced by a worm wheel of a speed reducing arrangement and is then transmitted to an output gear to drive a window regulator, which lowers and raises a window glass.

In the structure for transmitting the rotation from the worm wheel to the output gear, the worm wheel is rotatably supported by a support shaft (a center shaft), which is secured to a gear housing, and a cushion rubber is received in a recess, which is formed in one side of the worm wheel. The output gear is rotatably supported by the support shaft, and a transmission plate is secured to a worm wheel side end of the output gear. The output gear is made of a metal material to achieve a required strength, and the transmission plate and the worm wheel are made of a resin material to reduce the weight. The transmission plate and the worm wheel are engaged in a rotational direction through the cushion rubber. That is, the worm wheel and the transmission plate (the output gear) are connected with each other to transmit the drive force therebetween through the cushion rubber, which absorbs the shocks.

The worm wheel side end of the transmission plate axially protrudes from the worm wheel side end surface of the output gear and has a seal retaining hole at the protruded portion of the worn wheel side end of the transmission plate. An inner diameter of the seal retaining hole is larger than an outer diameter of the support shaft. That is, an inner peripheral surface of the seal retaining hole, the worm wheel side end surface of the output gear and an outer peripheral surface of the support shaft define an annular receiving recess, which opens on the worm wheel side thereof. An O-ring is received in the annular receiving recess. Furthermore, an annular protrusion, which is received in the annular receiving recess, is formed in the worm wheel around the support shaft. In the assembled state of the speed reducing arrangement, the O-ring is received in the annular receiving recess, and the annular receiving recess is closed by the annular protrusion of the worm wheel.

In the geared motor of the power window system, the output gear is exposed to a region where water, such as rain water or car wash water, is likely applied. Thus, water droplets may adhere to the output gear. However, the O-ring is closely engaged with its surrounding components (i.e., the components located on its four sides). Thus, the water, which is applied between the output gear and the support shaft or between the output gear and the transmission plate is limited from moving further into the interior of the gear housing.

The output gear and the worm wheel are rotatably supported by the support shaft. Thus, grease is applied in the space between the output gear, the worm wheel and the support shaft to provide lubrication and to limit abrasion. In the middle of the assembling operation of the speed reducing arrangement, the grease is applied to the support shaft at a location around the O-ring after installation of the worm wheel and the O-ring to the support shaft. Thereafter, the output gear, to which the transmission plate is secured, is installed to the support shaft.

At this time, the grease remains in the receiving recess. However, when the applied amount of grease is excessively large, the excessive amount of grease has no place to move. Thus, the excessive amount of grease may possibly push the O-ring out of the receiving recess. In some cases, the O-ring is expanded radially outward by the pressure applied from the compressed grease, so that a portion of the expanded O-ring may possibly be pinched between the transmission plate and the worm wheel and may be kept installed in that pinched state. Then, the pinched portion of the O-ring may be cut to cause a trouble.

In contrast, when the applied amount of grease is made too small to limit the above trouble, the sufficient lubrication and the sufficient abrasion limitation cannot be achieved. Furthermore, the grease also functions as rust inhibitor. Thus, rust may be generated in the metal component, at which the sufficient amount of grease is not applied.

Thus, it is required to precisely control the applied amount of grease, thereby causing tedious assembling of the motor (specifically, the speed reducing arrangement) and an increase in the assembling costs.

SUMMARY OF THE INVENTION

The present invention addresses at least one of the above disadvantages.

According to one aspect of the present invention, there is provided a geared motor that includes a motor arrangement and a speed reducing arrangement, which are assembled together. The speed reducing arrangement reduces a rotational speed of the motor arrangement and includes a housing, a support shaft, a worm wheel, a rotation transmitting member, an output gear and an annular seal member. The support shaft is secured to the housing. The worm wheel is rotatably supported by the support shaft and reduces the rotational speed of the motor arrangement. The rotation transmitting member includes a receiving through hole, which has an inner diameter larger than an outer diameter of the support shaft and receives the support shaft therethrough. The rotation transmitting member is engageable with the worm wheel to rotate integrally with the worm wheel upon receiving a rotational drive force from the worm wheel. The output gear is engageable with the rotation transmitting member to rotate integrally with the rotation transmitting member and thereby to transmit the rotational drive force of the rotation transmitting member to an external load connected to the output gear upon receiving the rotational drive force from the rotation transmitting member. The annular seal member is installed to the support shaft in such a manner that the annular seal member is positioned in an inner space of the receiving through hole of the rotation transmitting member. The annular seal member tightly engages at least with the support shaft and the rotation transmitting member to seal therebetween. Grease is applied to an outer peripheral surface of the support shaft. A grease relief passage, which relives the grease, extends in at least one of between the output gear and the rotation transmitting member and between the output gear and the support shaft. The grease relief passage is communicated with the inner space of the receiving through hole, which receives the annular seal member.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

One embodiment of the present invention will be described with reference to the accompanying drawings.

Figure 1:
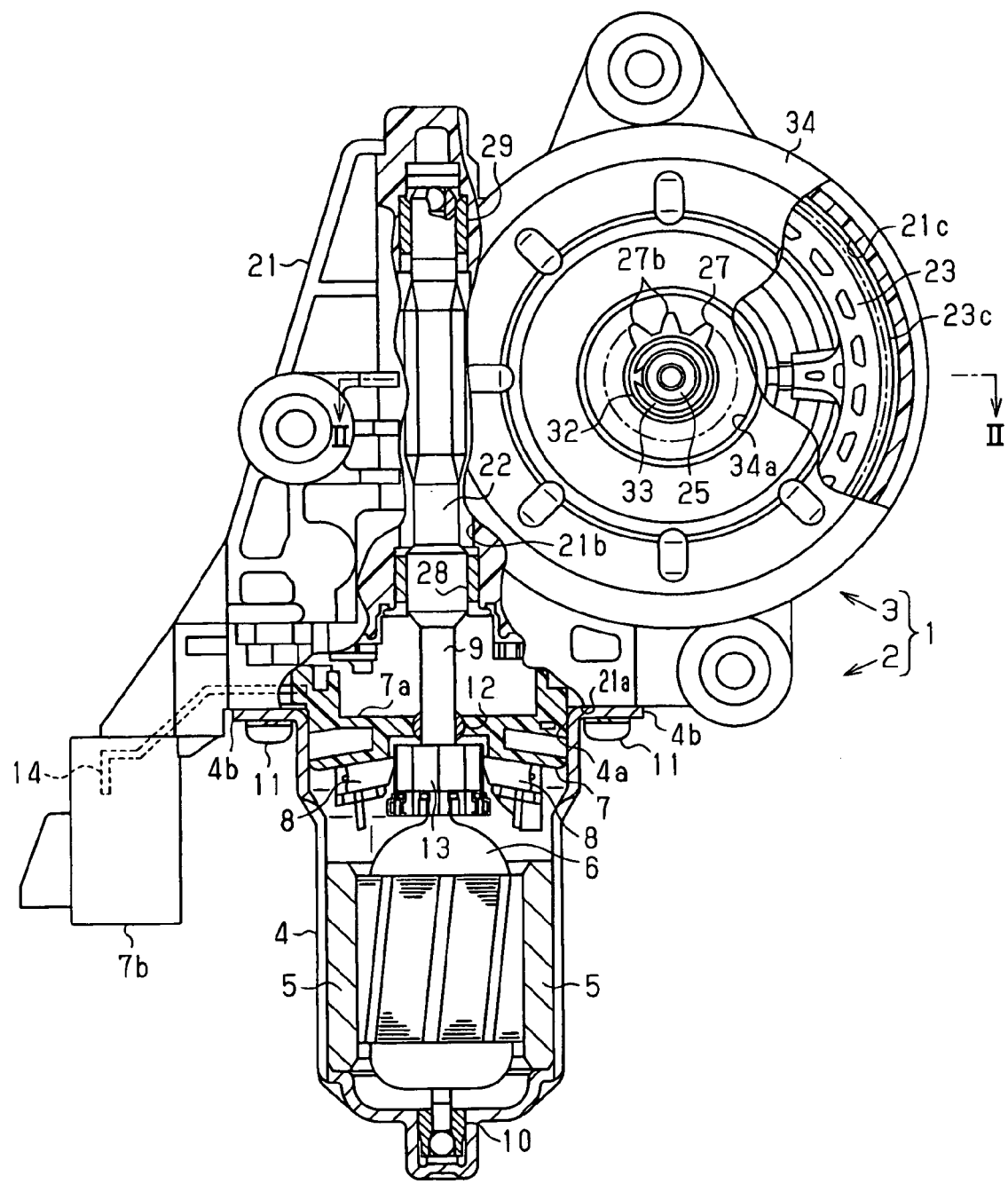
FIG. 1 is a cross sectional view of a geared motor according to an embodiment.

FIG. 1 shows a geared motor 1 according to the present embodiment. The geared motor 1 is a motor that is used as a drive power source of, for example, a power window system installed in a vehicle. The geared motor 1 includes a motor arrangement 2 and a speed reducing arrangement 3.

The motor arrangement 2 includes a yoke housing 4, two magnets 5, an armature 6, a brush holder 7 and two brushes 8.

The yoke housing 4 is made from a magnetic metal plate material, which is pressed into a generally flat cup shaped body. The magnets 5 are secured to an inner peripheral surface of the yoke housing 4. The armature 6 is placed radially inward of the magnets 5 in the yoke housing 4 in a manner that allows rotation of the armature 6. The armature 6 includes a rotatable shaft 9. A base end of the rotatable shaft 9 is rotatably supported by a bearing 10, which is installed to a bottom center of the yoke housing 4.

An opening 4a of the yoke housing 4 has two flanges 4b, which extend radially outward. The flanges 4b are provided to secure the yoke housing 4 against a gear housing 21 with screws 11. A brush holder 7 is clamped between the opening 4a of the yoke housing 4 and an opening 21a of the gear housing 21.

The brush holder 7 is made of a resin material and has a holder main body 7a, which is fitted into the opening 4a of the yoke housing 4. A bearing 12 is installed to a center of the holder main body 7a to rotatably support a longitudinal intermediate portion of the rotatable shaft 9. Two brushes 8 are supported on a motor arrangement 2 side of the holder main body 7a to slidably engage a commutator 13 of the armature 6. Furthermore, a connector 7b is integrally formed in the brush holder 7 in such a manner that the connector 7b is exposed outside of the housings 4, 21. Electric power is supplied to the brushes 8 from an external electric power source through terminals 14, which extend in the brush holder 7 from the connector 7b. Then, the electric power is supplied from the brushes 8 to the commutator 13.

The speed reducing arrangement 3 includes the gear housing 21, a worm shaft 22, a worm wheel 23, a cushion rubber 24, a support shaft 25, a transmission plate (a rotation transmitting member) 26 and an output gear 27.

The gear housing 21 is made of a resin material and is formed into a predetermined shape to receive the worm shaft 22 and the worm wheel 23. The gear housing 21 has the opening 21a, which is opposed to the opening 4a of the yoke housing 4. The yoke housing 4 is secured to the gear housing 21 with the screws 11 in such a manner that the brush holder 7 is clamped between the opening 21a of the gear housing 21 and the opening 4a of the yoke housing 4.

Furthermore, the gear housing 21 includes a shaft receiving hole 21b and a wheel receiving recess 21c. The shaft receiving hole 21b is communicated with the opening 21d to receive the worm shaft 22. The wheel receiving recess 21c is communicated with the shaft receiving hole 21b to receive the worm wheel 23. In the shaft receiving hole 21b, the worm shaft 22 is rotatably supported by bearings 28, 29, which are provided at axially opposed ends, respectively, of the shaft receiving hole 21b. The worm shaft 22 is connected to the rotatable shaft 9, which extends from the motor arrangement 2. The worm shaft 22 is made of a metal material.

Figure 2:
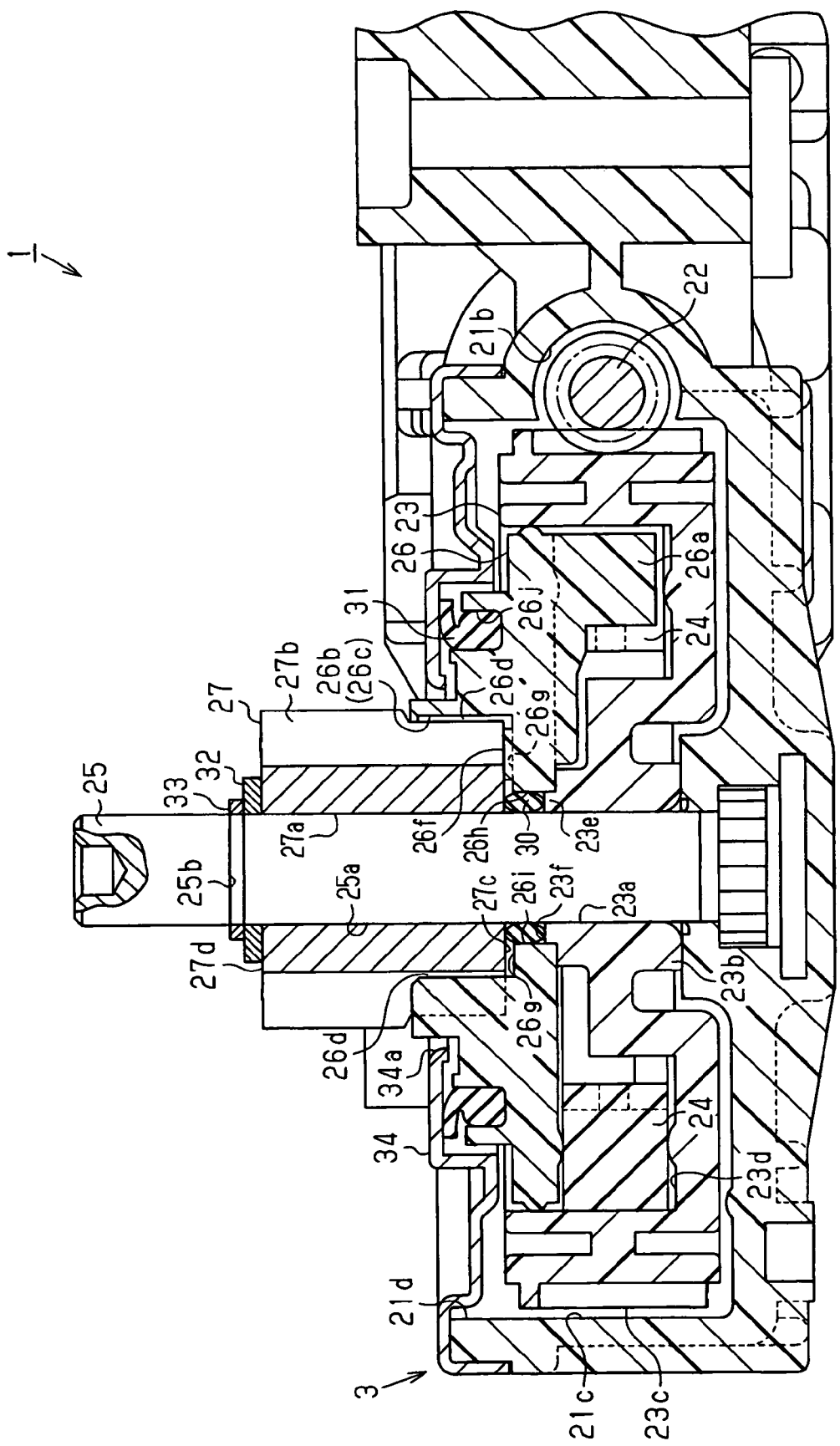
FIG. 2 is a cross sectional view taken along line II-II in FIG. 1, showing a speed reducing arrangement.

As shown in FIG. 2, one end of the wheel receiving recess 21c is opened, and the support shaft 25, which has a generally cylindrical shape, is secured in a center of a bottom of the wheel receiving recess 21c. A base end of the support shaft 25 is secured to the gear housing 21 by insert molding, and a distal end of the support shaft 25 projects from the opening 21d of the wheel receiving recess 21c. The support shaft 25 extends through the worm wheel 23 and rotatably supports the worm wheel 23. The worm wheel 23 is made of a resin material.

The worm wheel 23 includes a fitting through hole 23a, a boss portion 23b, a plurality of teeth 23c and a wheel inner recess 23d. The support shaft 25 is received through the fitting through hole 23a. The boss portion 23b is formed into a generally annular tubular body, which surrounds the fitting through hole 23a. The teeth 23c are formed in an outer peripheral part of the worm wheel 23 and are meshed with the worm shaft 22. The wheel inner recess 23d is radially located between the teeth 23c and the boss portion 23b and is opened at one end in the direction that is same as that of the wheel receiving recess 21c.

The wheel inner recess 23d receives the resilient cushion rubber 24. The cushion rubber 24 engages a plurality of engaging projections (not shown), which project into the wheel inner recess 23d, in a rotational direction. Thus, the cushion rubber 24 rotates integrally with the worm wheel 23. The transmission plate 26 is placed in the opening of the wheel inner recess 23d to close the wheel inner recess 23d. The transmission plate 26 is made of a resin material.

The transmission plate 26 is formed into a generally disk-shaped body. An outer peripheral part of the transmission plate 26 engages an inner peripheral wall surface of the wheel inner recess 23d at the opening of the wheel inner recess 23d. The transmission plate 26 has a plurality of engaging projections 26a (only one is shown in FIG. 2), which are provided to a worm wheel 23 side of the transmission plate 26 to engage the cushion rubber 24 in the rotational direction. The engaging projections 26a of the transmission plate 26 and the engaging projections (not shown) of the cushion rubber 24 are alternately arranged in the rotational direction in the wheel inner recess 23d. That is, the transmission plate 26 and the worm wheel 23 are engaged, i.e., connected to each other through the shock absorbable cushion rubber 24 to transmit a drive force therebetween.

An installation recess 26b is formed in the center of the transmission plate 26 on the opposite side of the transmission plate 26, which is opposite from the worm wheel 23, to receive the output gear 27. The output gear 27 is made of a metal material and has a fitting through hole 27a and a plurality of teeth 27b. The support shaft 25 is received through the fitting through hole 27a. The teeth 27b are formed in an outer peripheral part of the output gear 27. Each tooth 27b continuously extends from a base end to a distal end of the output gear 27 in the axial direction. The base end of the output gear 27 (the teeth 27b) is received in the installation recess 26b of the transmission plate 26 and is thereby connected to the transmission plate 26 in a manner that allows integral rotation of the output gear 27 with the transmission plate 26.

Figure 3:
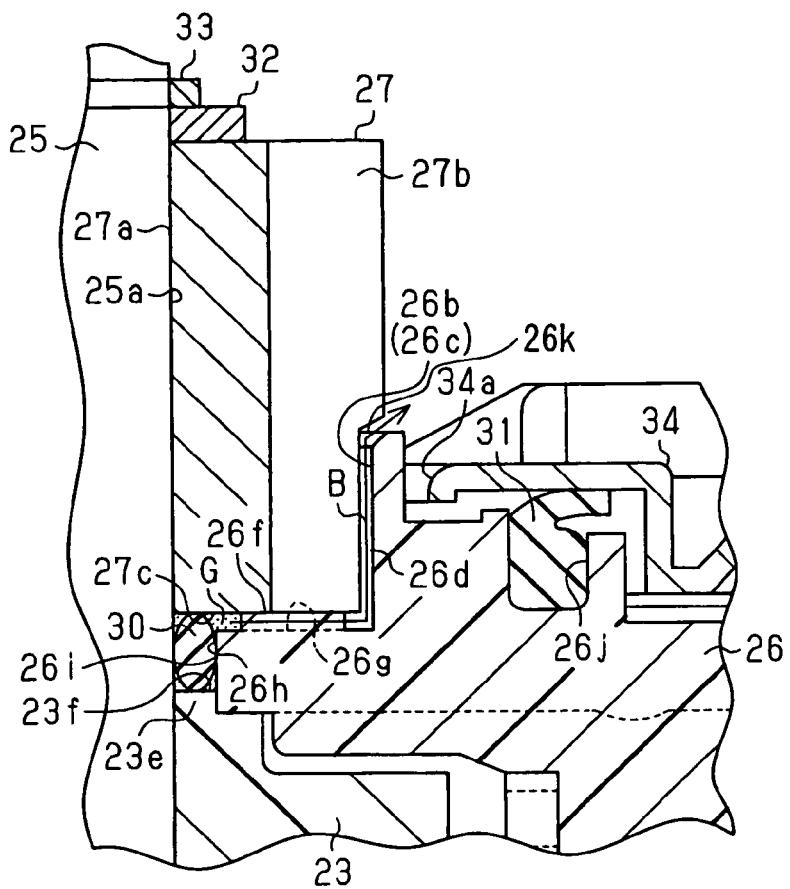
FIG. 3 is a partial enlarged view of the speed reducing arrangement shown in FIG. 2.
Figure 4:
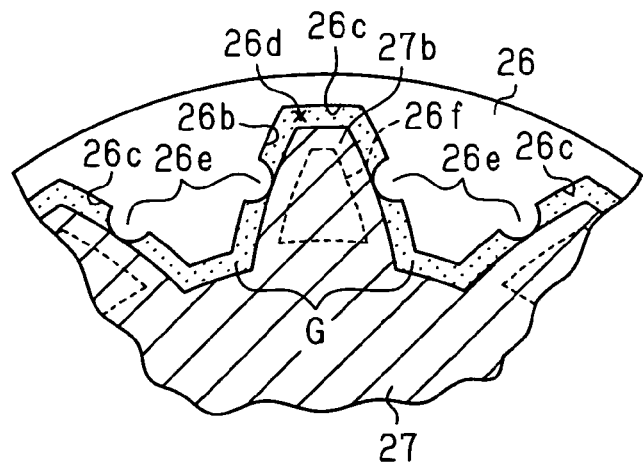
FIG. 4 is a partial cross sectional view for describing a connection between an output gear and a transmission plate of the geared motor.
Figure 5:
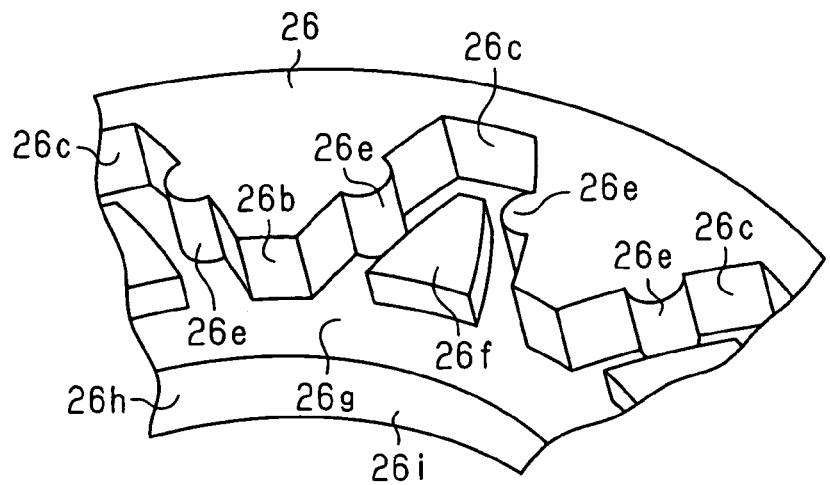
FIG. 5 is a partial perspective view showing an installation recess of the transmission plate.

The installation recess 26b of the transmission plate 26 has a plurality of tooth-shaped recesses 26c, which correspond to the teeth 27b of the output gear 27, as shown in FIGS. 3 to 5. In an axial view, each tooth-shaped recess 26c is larger than the opposed tooth 27b and is shaped such that an inner peripheral wall surface of the tooth-shaped recess 26c corresponds with an outer shape of the tooth 27b. Specifically, the inner peripheral wall surface of each tooth-shaped recess 26c forms a generally constant space relative to a tooth tip, a tooth flank and a tooth root of the opposed tooth 27b, and a space 26d is formed between the inner peripheral wall surface of the tooth-shaped recess 26c and the opposed tooth 27b.

Semi-cylindrical connecting protrusions 26e protrude from the inner peripheral wall surface of each tooth-shaped recess 26c to engage with the radial center of the tooth flank of the opposed tooth 27b. Specifically, when the connecting protrusions 26e of the tooth-shaped recesses 26c are urged against the tooth flanks of the teeth 27b upon rotation of the transmission plate 26, the transmission plate 26 is engaged with the output gear 27 in the rotational direction, and the transmission plate 26 is held in the base end of the output gear 27.

As shown in FIG. 5, contacting protrusions 26f, which contact a base end surface 27c of the output gear 27 (the teeth 27b), protrude from base surfaces, respectively, of the tooth-shaped recesses 26c. Each contacting protrusion 26f has a generally rectangular outer contour, which is smaller than that of the opposed tooth 27b, when the contacting protrusion 26f and the tooth 27b are seen in the axial direction. That is, each contacting protrusion 26f defines a space between the contacting protrusion 26f and the adjacent connecting protrusions 26e, which protrude from the inner peripheral wall surface of the adjacent tooth-shaped recess 26c. Due to the axial protrusion of each contacting protrusion 26f, a groove 26g is formed around each contacting protrusion 26f. The groove 26g communicates with the space 26d, which is defined between the inner peripheral wall surface of the corresponding tooth-shaped recess 26c and the corresponding tooth 27b of the output gear 27 upon positioning of the tooth 27b in the tooth-shaped recess 26c. Thus, the groove 26g is opened to an outside of the gear housing 21 through the space 26d and an opening 26k of the space 26d. Furthermore, the grooves 26g of the tooth-shaped recesses 26c are communicated with each other in a circumferential direction (around a receiving through hole 26h) and are also communicated with the receiving through hole 26h, which is provided in the center of the installation recess 26b. The bottom of the installation recess 26b (the grooves 26g and the contacting protrusions 26f) form an axial support section of the transmission plate 26, which is axially opposed to the base end of the output gear 27.

The support shaft 25 is inserted through the receiving through hole 26h, which is provided in the center of the installation recess 26b. An inner diameter of the receiving through hole 26h is made slightly larger than an outer diameter of the support shaft 25. The inner diameter of the receiving through hole 26h is set in such a manner that a radial size of a cross section of an annular space between an inner peripheral surface 26i of the through hole 26h and an outer peripheral surface 25a of the support shaft 25 is slightly smaller than an outer diameter of a cross section of a relaxed, unstressed O-ring 30, which will be described below in detail. An annular protrusion 23e, which is formed in the boss portion 23b of the worm wheel 23, is fitted into a base end side (a worm wheel 23 side) of the receiving through hole 26h, and the transmission plate 26 is rotatably supported by the annular protrusion 23e.

An annular recess 26j is formed radially outward of the installation recess 26b of the transmission plate 26. A seal ring 31 is fitted into the annular recess 26j in such a manner that the seal ring 31 slidably contacts an inner surface of a cover member 34 to seal therebetween.

The O-ring 30, which is installed to the support shaft 25, is received in the annular inner space, which is surrounded by the inner peripheral surface 26i of the through hole 26h, the base end surface 27c of the output gear 27 and a top surface 23f of the annular protrusion 23e. The O-ring 30 tightly engages these surfaces 26i, 27c, 23f and the outer peripheral surface 25a. That is, the O-ring 30 limits further intrusion of an external substance or material (e.g., water) through the space between the output gear 27 and the support shaft 25 or through the space between the output gear 27 and the transmission plate 26.

In order to provide lubrication and to limit abrasion, grease G is applied to the space, which receives the O-ring 30. Furthermore, the grease G is also applied between the worm wheel 23 and the support shaft 25. In addition, the grease G is also applied between the output gear 27 and the support shaft 25. The grease G also limits further intrusion of the external substance or material (e.g., the water) into the interior of the gear housing 21 (the wheel receiving recess 21c) through the above described corresponding path.

A washer 32 is provided on a distal end surface 27d of the output gear 27. A snap ring 33 is installed on a top surface of the washer 32 in such a manner that the snap ring 33 is installed in an installation groove 25b, which is formed in the outer peripheral surface 25a of the support shaft 25. Removal of the output gear 27 from the support shaft 25 is limited by the washer 32 and the snap ring 33.

The cover member 34 is installed to the opening 21d of the wheel receiving recess 21c to close the opening 21d. A gear receiving through hole 34a is formed in the center of the cover member 34 to allow outward protrusion of the output gear 27 through the gear receiving through hole 34a. The seal ring 31, which is installed to the transmission plate 26, slidably contacts an inner surface of the cover member 34 in such a manner that the seal ring 31 extends all around the gear receiving through hole 34a. That is, the seal ring 31 limits movement of the external substance or material (e.g., the water), which is applied through the gear receiving through hole 34a, into the interior of the gear housing 21 (the wheel receiving recess 21c) from the seal ring 31. The output gear 27, which is exposed from the gear receiving through hole 34a, is meshed with a well known regulator (an external load) of an X-arm type (not shown), which is driven to open and close (i.e., to lower and raise) a window glass (not shown) by a drive force transmitted from the output gear 27.

An assembling procedure of the speed reducing arrangement 3 is as follows. First, the worm wheel 23 is installed to the support shaft 25, which projects in the wheel receiving recess 21*c* of the gear housing 21. Next, the cushion rubber 24 is received in the wheel inner recess 23*d*. Thereafter, the O-ring 30 is installed to the support shaft 25. At this time, the grease G is applied to the support shaft 25 at a location near the O-ring 30. Furthermore, the base end of the output gear 27 is fitted to the installation recess 26*b* of the transmission plate 26, and the transmission plate 26 is held at the base end of the output gear 27. The output gear 27, which holds the transmission plate 26, is fitted to the support shaft 25 in such a manner that the annular protrusion 23*e*, which is provided to the boss portion 23*b* of the worm wheel 23, is fitted into the receiving through hole 26*h* of the transmission plate 26.

In this case, the applied grease G mostly stays in the receiving through hole 26*h* of the transmission plate 26, and an excessive amount of grease G is movable (escapable) into a grease relief passage, more specifically, the excessive amount of grease G moves from the receiving through hole 26*h* into the respective groove 26*g* and thereafter into the respective space 26*d* between the respective tooth-shaped recess 26*c* and the output gear 27. With this structure, the excessive amount of grease G escapes into the groove 26*g* before the excessive amount of grease G pushes the O-ring 30 out of the receiving through hole 26*h* of the transmission plate 26. As a result, it is possible to limit the grease G from pushing the O-ring 30 out of the receiving through hole 26*h* of the transmission plate 26. In this way, the expansion of the O-ring 30 by the excessive amount of grease G, which causes clamping of the O-ring 30 between the transmission plate 26 and the worm wheel 23, is advantageously limited.

In the geared motor 1 of the present embodiment, when the motor arrangement 2 is rotated to rotate the rotatable shaft 9 through supply of the electric power to the connector 7*b*, the worm shaft 22 is rotated together with the rotatable shaft 9. Thus, the rotation of the worm shaft 22 causes rotation of the worm wheel 23, which in turn causes rotation of the transmission plate 26 through the cushion rubber 24 and thereby causes rotation of the output gear 27. Then, the rotation of the output gear 27 drives the regulator to lower or raise the window glass.

Next, advantages of the present embodiment will be described.

(1) The worm wheel 23, the O-ring 30, the transmission plate 26 and the output gear 27 are installed to the support shaft 25. The O-ring 30 is positioned in the receiving through hole 26*h*, in which the support shaft 25 of the transmission plate 26 is received. The grease G is applied to the outer peripheral surface of the support shaft 25 to provide the lubrication and to limit the abrasion. The respective groove 26*g* and the respective space 26*d* between the respective tooth-shaped recess 26*c* and the output gear 27 are provided between the output gear 27 and the transmission plate 26 to form the grease relief passage that is communicated with the interior space of the receiving through hole 26*h*, which receives the O-ring 30.

Therefore, at the time of installing the worm wheel 23, the O-ring 30, the transmission plate 26 and the output gear 27 to the support shaft 25, the grease G is applied to the outer peripheral surface of the support shaft 25, and this applied grease G remains in the interior of the receiving through hole 26*h*, which receives the O-ring 30. Here, even when the applied amount of grease G is excessively set to provide the sufficient amount of grease G to each of the subject points, which require the grease G, the excessive amount of grease G escapes into the above relief passage, which is formed between the output gear 27 and the transmission plate 26, before the excessive amount of grease G pushes the O-ring 30 out of the receiving through hole 26*h* at the time of installing the O-ring 30 into the receiving through hole 26*h*. In this way, the amount of grease G in the receiving through hole 26*h*, which receives the O-ring 30, is adjusted to the appropriate amount. As a result, it is possible to limit occurrence of assembling troubles, such as pushing of the O-ring 30 out of the receiving through hole 26*h* caused by the grease G. Also, it is no longer required to precisely control the applied amount of grease G.

The geared motor 1 of the present embodiment is used as the drive power source of the vehicle power window system. Thus, when the geared motor 1 is used as the drive power source of the vehicle power window system, the output gear 27 is placed in the area, in which there is a high possibility of application of water. Thus, when the installation of the O-ring 30 and the application of the grease G are appropriately performed in the above described manner, the intrusion of the water from the output gear 27 into the interior of the gear housing 21 can be advantageously limited.

(2) The space 26*d* forming the grease relief passage between the respective tooth-shaped recess 26*c* and the output gear 27 is opened to the outside of the gear housing 21 at the opening 26*k*. Therefore, the air in the passage can escapes through the opening 26*k*, and the excessive amount of grease G can escape into the passage (the groove 26*g*). In this way, the adjustment of the amount of grease in the receiving through hole 26*h*, which receives the O-ring 30, can be appropriately performed, and thereby the occurrence of the assembling troubles can be effectively limited.

Furthermore, the grease relief passage is opened to the outside of the gear housing 21 at the opening 26*k*, so that the excessive amount of grease G can be outputted to the outside of the gear housing 21. In this way, it is possible to limit adhesion of the excessive amount of grease G to the components received in the gear housing 21.

(3) The grease relief passage (particularly, the groove 26*g*) extends continuously in a form of an annular passage all around the receiving through hole 26*h*. Thus, with this structure, the escape of the excessive amount of grease G into the relief passage (the groove 26*g*) is promoted or eased.

(4) The grease relief passage is formed in the transmission plate 26, which is made of the resin material. Thus, for example, formation of the grooves 26*g*, which constitute the grease relief passage, in the transmission plate 26 is eased in comparison to a case where the grease relief passage is formed in the metal output gear 27 and/or the metal support shaft 25. Thus, it is possible to minimize the manufacturing costs.

The above embodiment can be modified as follows.

In the above embodiment, the respective groove 26*g* and the respective space 26*d* between the respective tooth-shaped recess 26*c* and the output gear 27 are used as the grease relief passage for escaping the grease G. However, the present invention is not limited to this. For example, the grease relief passage can be in a form of, for example, a through hole, which penetrates through any one or more of, for example, the transmission plate 26, the output gear 27, the support shaft 25 and the worm wheel 23. Furthermore, in the above embodiment, the space 26*d* between the respective tooth-shaped recess 26*c* and the output gear 27 is opened to the outside of the gear housing 21 at the opening 26*k*. Alternatively, the space 26*d* may be opened to the interior of the gear housing 21. Furthermore, if the opening of the space 26*d* is not necessary, the opening of the space 26*d* may be eliminated. In the above embodiment, the grooves 26*g*, which constitute the grease relief passage, are continuously formed in the circumferential direction all around the receiving through hole 26h. Alternatively, the groove 26g may be divided in a plurality of independent grooves 26g, which are separated from one another in the circumferential direction.

Figure 7:
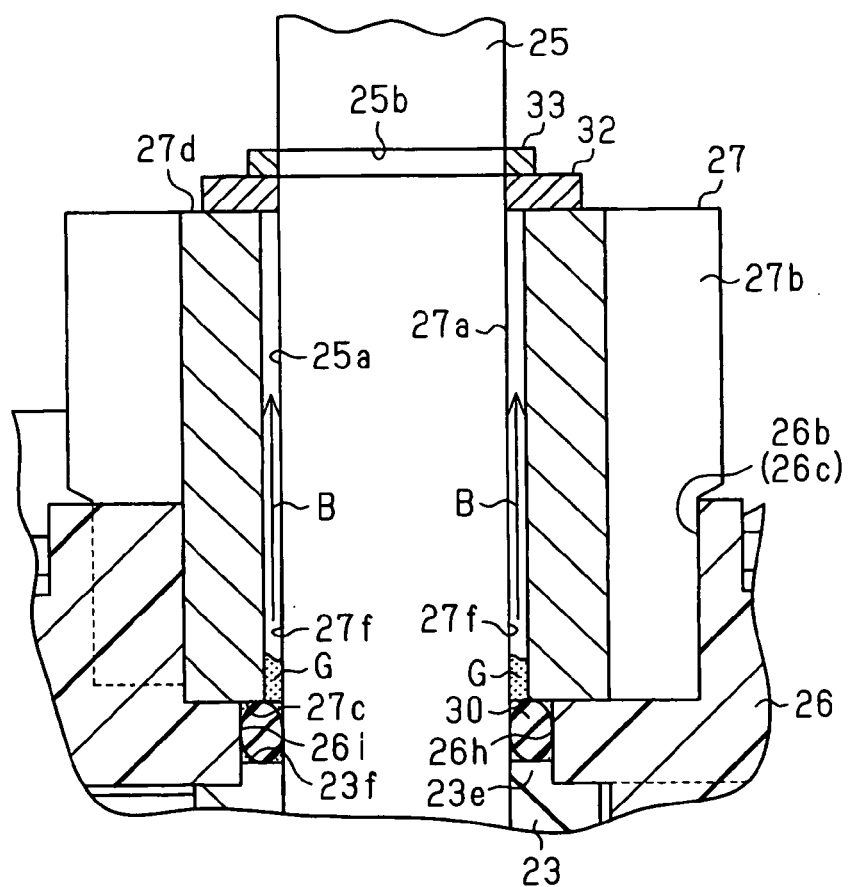
FIG. 7 is a partial enlarged view of a speed reducing arrangement according to another modification of the embodiment.
Figure 6A:
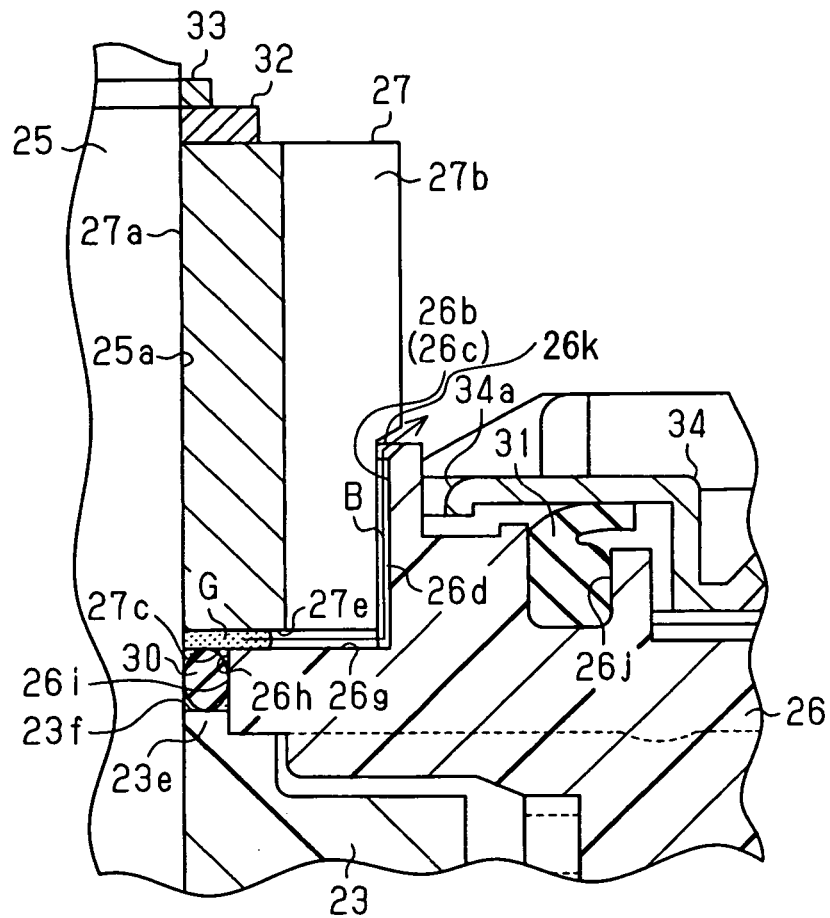
FIG. 6A is an enlarged cross sectional view of a speed reducing arrangement according to a modification of the embodiment.
Figure 6B:
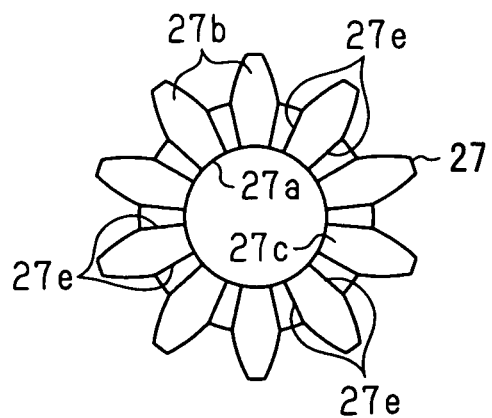
FIG. 6B is a bottom view of an output gear of the speed reducing arrangement of FIG. 6A.

In the above embodiment, the grease relief passage (the respective groove 26g, the respective space 26d) for escaping, i.e., relieving the grease G is formed in the transmission plate 26. Alternatively, as shown in FIGS. 6A and 6B, grooves 27e, which constitute the grease relief passage, may be formed in the base end surface 27c of the output gear 27. In such a case, the grooves 27e radially extend from the fitting through hole 27a toward the tooth roots, each of which is formed between the corresponding teeth 27b (in FIG. 6A, an arrow B indicates an escape direction of the grease G). Also, in such a case, the protrusions 26f of FIG. 5 may be eliminated to provide a planar surface in the axial support section of the transmission plate 26, if desired. Furthermore, as shown in FIG. 7, axially extending grooves 27f, which constitute the grease relief passage, may be formed one after another along the inner peripheral surface of the fitting through hole 27a of the output gear 27, as shown in FIG. 7 (in FIG. 7, the arrow B indicates the escape direction of the grease G). Furthermore, although not shown, a plurality of axially extending grooves, which constitute the grease relief passage, may be formed one after another along the outer peripheral surface 25a of the support shaft 25. Furthermore, any one or any combination of the above modifications may be implemented in the above embodiment to form the grease relief passage for escaping the grease G.

In the above embodiment, the output gear 27 is uniformly formed in the axial direction, and the installation recess 26b is formed in the transmission plate 26 in the shape that corresponds to the teeth 27b to engage with the base end of the output gear 27, which includes the teeth 27b. However, the shape of the base end of the output gear 27 and the shape of the installation recess 26b are not limited to these. For example, the shape of the base end of the output gear 27 and the shape of the respective installation recess 26b may be changed to, for example, any appropriate polygonal shape, a double-sided shape having two generally parallel sides or a D-cut shape.

In the above embodiment, each of the output gear 27 and the support shaft 25 is made from the metal, and the transmission plate 26 is made from the resin. However, any one or more of the material of the output gear 27, the material of the support shaft 25, and the material of the transmission plate 26 may be changed from the current one to any appropriate material.

In the above embodiment, the transmission plate 26 is previously installed to and is thereby held by the output gear 27, and then the output gear 27 is installed to the support shaft 25. Alternatively, the transmission plate 26 and the output gear 27 may be separately installed to the support shaft 25.

In the above embodiment, the present invention is implemented in the motor 1 of the power window system. Alternatively, the present invention is equally applicable to any other appropriate device, such as a motor of a door closer system, which is installed in the vehicle. A structure and usage of the motor of the door closer system are similar to those of the motor 1 of the power window system, so that the present invention can be effectively applied in the motor of the door closer system. Furthermore, the present invention can be applied in a motor that is used as a drive power source of an apparatus or system other than those of the vehicle.

Additional advantages and modifications will readily occur to those skilled in the art. The invention in its broader terms is therefore not limited to the specific details, representative apparatus, and illustrative examples shown and described.

What is claimed is:

1. A geared motor comprising a motor arrangement and a speed reducing arrangement, which are assembled together, wherein:
   the speed reducing arrangement reduces a rotational speed of the motor arrangement and includes:
      a housing;
      a support shaft that is secured to the housing;
      a worm wheel that is rotatably supported by the support shaft and reduces the rotational speed of the motor arrangement;
      a rotation transmitting member that includes a receiving through hole, which has an inner diameter larger than an outer diameter of the support shaft and receives the support shaft therethrough, wherein the rotation transmitting member is engageable with the worm wheel to rotate integrally with the worm wheel upon receiving a rotational drive force from the worm wheel;
      an output gear that is engageable with the rotation transmitting member to rotate integrally with the rotation transmitting member and thereby to transmit the rotational drive force of the rotation transmitting member to an external load connected to the output gear upon receiving the rotational drive force from the rotation transmitting member;
      an annular seal member that is installed on the support shaft in such a manner that the annular seal member is positioned in an inner space of the receiving through hole of the rotation transmitting member; and
      a fixing device that is installed on the support shaft and limits axial movement of the output gear relative to the support shaft in a direction away from the rotation transmitting member;
   the annular seal member tightly engages at least with the support shaft and the rotation transmitting member to seal therebetween;
   grease is applied to an outer peripheral surface of the support shaft;
   a grease relief passage, which relieves grease, extends between the output gear and the rotation transmitting member; and
   the grease relief passage is communicated with the inner space of the receiving through hole, which receives the annular seal member;
   a base end of the output gear, which is axially opposed to an axial support section of the rotation transmitting member, includes a plurality of axial protrusions, each of which protrudes from the rest of the base end of the output gear in an axial direction of the output gear toward the axial support section of the rotation transmitting member and axially contacts the axial support section of the rotation transmitting member in the axial direction of the output gear without leaving an axial gap between the axial protrusion and the axial support section of the rotation transmitting member; and
   the grease relief passage includes a space that is circumferentially placed between corresponding adjacent two of the plurality of axial protrusions of the base end of the output gear.

2. The geared motor according to claim 1, wherein the grease relief passage has at least one opening.

3. The geared motor according to claim 2, wherein one of the at least one opening of the grease relief passage is opened at an outside of the housing.

4. The geared motor according to claim 1, wherein the grease relief passage includes an annular passage, which extends all around the receiving through hole.

5. The geared motor according to claim 1, wherein:
each of the output gear and the support shaft is made of metal; and the rotation transmitting member is made of resin.

6. The geared motor according to claim 1, wherein the geared motor serves as a drive power source of a power window system or of a door closer system in a vehicle.

7. The geared motor according to claim 1, wherein the space of the grease relief passage extends all around at least one of the corresponding adjacent two of the plurality of axial protrusions of the base end of the output gear in a plane, which is perpendicular to an axial direction of the output gear.

8. The geared motor according to claim 1, wherein two connecting protrusions, which are circumferentially opposed to each other, protrude from an inner peripheral wall of the rotation transmitting member and circumferentially contact a corresponding portion of the output gear to circumferentially hold the same.

9. A geared motor comprising a motor arrangement and a speed reducing arrangement, which are assembled together, wherein:
the speed reducing arrangement reduces a rotational speed of the motor arrangement and includes:
a housing;
a support shaft that is secured to the housing;
a worm wheel that is rotatably supported by the support shaft and reduces the rotational speed of the motor arrangement;
a rotation transmitting member that includes a receiving through hole, which has an inner diameter larger than an outer diameter of the support shaft and receives the support shaft therethrough, wherein the rotation transmitting member is engageable with the worm wheel to rotate integrally with the worm wheel upon receiving a rotational drive force from the worm wheel;
an output gear that is engageable with the rotation transmitting member to rotate integrally with the rotation transmitting member and thereby to transmit the rotational drive force of the rotation transmitting member to an external load connected to the output gear upon receiving the rotational drive force from the rotation transmitting member;
an annular seal member that is installed on the support shaft in such a manner that the annular seal member is positioned in an inner space of the receiving through hole of the rotation transmitting member; and
a fixing device that is installed on the support shaft and limits axial movement of the output gear relative to the support shaft in a direction away from the rotation transmitting member;
the annular seal member tightly engages at least with the support shaft and the rotation transmitting member to seal therebetween;
grease is applied to an outer peripheral surface of the support shaft;
a grease relief passage, which relieves grease, extends between the output gear and the rotation transmitting member; and
the grease relief passage is communicated with the inner space of the receiving through hole, which receives the annular seal member;
an axial support section of the rotation transmitting member, which is axially opposed to a base end of the output gear, includes a plurality of axial protrusions, each of which protrudes from the rest of the axial support section in an axial direction of the rotation transmitting member toward the base end of the output gear and axially contacts the base end of the output gear in the axial direction of the output gear without leaving an axial gap between the axial protrusion and the base end of the output gear; and
the grease relief passage includes a space that is circumferentially placed between corresponding adjacent two of the plurality of axial protrusions of the axial support section of the rotation transmitting member.

10. The geared motor according to claim 9, wherein the grease relief passage has at least one opening.

11. The geared motor according to claim 10, wherein one of the at least one opening of the grease relief passage is opened at an outside of the housing.

12. The geared motor according to claim 9, wherein the grease relief passage includes an annular passage, which extends all around the receiving through hole.

13. The geared motor according to claim 9, wherein:
each of the output gear and the support shaft is made of metal;
the rotation transmitting member is made of resin; and
the grease relief passage is formed in the rotation transmitting member.

14. The geared motor according to claim 9, wherein the geared motor serves as a drive power source of a power window system or of a door closer system in a vehicle.

15. The geared motor according to claim 9, wherein the space of the grease relief passage extends all around at least one of the corresponding adjacent two of the plurality of axial protrusions of the axial support section of the rotation transmitting member in a plane, which is perpendicular to an axial direction of the rotation transmitting member.

16. The geared motor according to claim 9, wherein two connecting protrusions, which are circumferentially opposed to each other, protrude from an inner peripheral wall of the rotation transmitting member and circumferentially contact a corresponding portion of the output gear to circumferentially hold the same.

* * * * *